(12) United States Patent
Bellm et al.

(10) Patent No.: US 11,936,203 B2
(45) Date of Patent: Mar. 19, 2024

(54) METHOD FOR OPERATING A DEVICE FOR WIRELESS TRANSFER OF ENERGY IN THE DIRECTION OF AN ELECTRICAL CONSUMER BY MEANS OF INDUCTIVE COUPLING AND DEVICE

(71) Applicant: E.G.O. Elektro-Geraetebau GmbH, Oberderdingen (DE)

(72) Inventors: Mathias Bellm, Ubstadt-Weiher (DE); Christian Egenter, Bretten (DE); Max-Felix Mueller, Oberderdingen (DE); Ulrich Waechter, Bruchsal (DE)

(73) Assignee: E.G.O. ELEKTRO-GERAETEBAU GMBH, Oberderdingen (DE)

( * ) Notice: Subject to any disclaimer, the term of this patent is extended or adjusted under 35 U.S.C. 154(b) by 0 days.

(21) Appl. No.: 18/050,596

(22) Filed: Oct. 28, 2022

(65) Prior Publication Data
US 2023/0145468 A1 May 11, 2023

(30) Foreign Application Priority Data
Nov. 8, 2021 (DE) ...................... 10 2021 212 550.6

(51) Int. Cl.
*H02J 50/12* (2016.01)
*G01H 13/00* (2006.01)
*H02J 50/60* (2016.01)
*H02J 50/80* (2016.01)

(52) U.S. Cl.
CPC ............ *H02J 50/12* (2016.02); *G01H 13/00* (2013.01); *H02J 50/60* (2016.02); *H02J 50/80* (2016.02)

(58) Field of Classification Search
CPC ............ H02J 50/12; H02J 50/60; H02J 50/80; G01H 13/00
See application file for complete search history.

(56) References Cited

U.S. PATENT DOCUMENTS 10,085,303 B2    9/2018 Schilling et al.
11,316,383 B1*   4/2022 Terry ...................... H02J 50/12
(Continued)

FOREIGN PATENT DOCUMENTS

DE    102019214047 A1    3/2021
EP        2330866 A2    6/2011
(Continued)

OTHER PUBLICATIONS

German Patent and Trade Mark Office, Office Action received for Application No. 102021212550.6, dated Sep. 16, 2022, 11 pages, Germany.
(Continued)

*Primary Examiner* — Hal Kaplan
*Assistant Examiner* — Joseph N Inge
(74) *Attorney, Agent, or Firm* — Alston & Bird LLP

(57) ABSTRACT

A method is provided for operating a device for wireless transfer of energy in the direction of an electrical consumer via inductive coupling. The method involves sequentially carrying out a power transfer, a data exchange, a measurement of setup parameters, and a measurement of a resonance frequency, wherein during the power transfer, an electrical actual power emitted by an inverter is regulated to a predetermined electrical setpoint value, wherein during the data exchange, data are exchanged between the device and the electrical consumer via a communication unit, wherein during the measurement of the setup parameters, objects possibly arranged over a power coil are detected, wherein during the measurement of the resonance frequency, a resonance frequency of a resonant circuit having the power coil is ascertained, and wherein the measurement of the resonance frequency is executed immediately before or immediately after the measurement of the setup parameters or the data exchange.

8 Claims, 3 Drawing Sheets

(56) References Cited

U.S. PATENT DOCUMENTS

| | | | | |
|---|---|---|---|---|
| 2017/0133887 A1* | 5/2017 | Tominaga | ............... | H02J 50/80 |
| 2019/0296590 A1* | 9/2019 | Chae | ............... | H02J 7/02 |
| 2022/0376560 A1 | 11/2022 | Gonda et al. | | |
| 2022/0385117 A1* | 12/2022 | Moritomo | ............... | H04B 5/02 |

FOREIGN PATENT DOCUMENTS

| | | |
|---|---|---|
| EP | 3790158 A1 | 3/2021 |
| WO | WO 2016/041880 A1 | 3/2016 |
| WO | WO 2021/052672 A1 | 3/2021 |

OTHER PUBLICATIONS

Itraj, Mahesh, "Topology study for an inductive power transmitter in cordless kitchen system", Thesis for Master of Science in Electrical Power Engineering at Delft University of Technology, Jul. 26, 2017, Netherlands, retrieved from the Internet at <https://www.researchgate.net/publication/331959988_Topology_study_for_an_inductive_power_transmitter_in_cordless_kitchen_system> on Sep. 15, 2022, 101 pages.

Kashyap, Shruthi, et al., "Cook Over IP: Cordless Smart Kitchen Appliance Architectures and Protocols", Apr. 17, 2018, SpringerBriefs in Applied Sciences and Technology, Andreas Oechsner, Series Editor, Springer published on the Internet at <https://doi.org/10.10071978-3-030-85836-0_2> in Sep. 2021, 42 pages.

European Patent Office, Extended European Search Report received for Application No. 22202424.2, dated Mar. 17, 2023, 11 pages, Germany.

Kashyap, Shruthi, et al., "Chapter 2, KI—The Cordless Kitchen from *Cook Over IP: Cordless Smart Kitchen Appliance Architectures and Protocols*," Apr. 17, 2018, SpringerBriefs in Applied Sciences and Technology, Andreas Oechsner, Series Editor, Springer published on the Internet at <https://link.springer.com/10.1007/978-3-030-85836-0_2> on Sep. 30, 2021, 17 pages.

* cited by examiner

METHOD FOR OPERATING A DEVICE FOR WIRELESS TRANSFER OF ENERGY IN THE DIRECTION OF AN ELECTRICAL CONSUMER BY MEANS OF INDUCTIVE COUPLING AND DEVICE

CROSS-REFERENCE TO RELATED APPLICATIONS

This application claims priority to German Application No. 10 2021 212 550.6, filed Nov. 8, 2021, the contents of which are hereby incorporated herein in its entirety by reference.

The invention is based on the object of providing a method for operating a device for wireless transfer of energy in the direction of an electrical consumer by means of inductive coupling and a corresponding device, which enable the most reliable operation possible.

The method is used for operating a device for wireless transfer of energy in the direction of an electrical consumer by means of inductive coupling, also referred to as Wireless Power Transfer (WPT). Reference is made to the relevant technical literature with respect to the fundamentals of WPT. The method is preferably operated according to the WPC (Wireless Power Consortium) Ki (Cordless Kitchen) Standard. The device for wireless transfer of energy in the direction of an electrical consumer by means of inductive coupling can also be referred to as a transmitter and the electrical consumer can be referred to as a receiver.

The device has a conventional single-phase or multiphase rectifier for generating a DC voltage from an in particular sinusoidal grid voltage.

The device has an inverter powered from the DC voltage. The inverter can be, for example, a half-bridge inverter or a full-bridge inverter. The inverter is designed to generate a pulse-width-modulated actuation signal having settable frequency and/or settable duty cycle.

The device has a conventional power coil or transmitter coil, actuated by means of the inverter, which is designed to generate a magnetic field to transfer the energy. For this purpose, an actuation signal, which is periodic in particular, is generated by means of the inverter, in particular in the form of an actuation voltage, and the power coil or a resonant circuit having the power coil is actuated by or subjected to the actuation signal. The actuation signal typically has an operating point dependent on a power setpoint value or matching with the power setpoint value. An operating point refers in this case in particular to one or more properties of the actuation signal, for example, amplitude, duty cycle, and/or frequency of the actuation signal.

The device has a communication unit, which is designed to exchange data bidirectionally with the electrical consumer.

The method has the following sequentially executed steps: carrying out a power transfer by means of the device, carrying out a data exchange between the device and the electrical consumer, carrying out a measurement of setup parameters by means of the device, and carrying out a measurement of a resonance frequency by means of the device. The steps can always be executed in the same sequence.

During the power transfer, a power emitted by the inverter is regulated to a predetermined setpoint value, wherein a frequency and/or a duty cycle of the pulse-width-modulated actuation signal is/are used as manipulated variable(s) of the regulation.

During the data exchange, data are exchanged between the device and the electrical consumer by means of the communication unit, in particular according to an NFC method.

During the measurement of the setup parameters, objects possibly arranged over the power coil, in particular foreign objects, are detected. This is also referred to as Foreign Object Detection (FOD).

During the measurement of the resonance frequency, a resonance frequency of a resonant circuit having the power coil is ascertained. The measurement of the resonance frequency can be carried out, for example, essentially as described in EP 2 330 866 A2.

According to the invention, the measurement of the resonance frequency is executed immediately before or immediately after the measurement of the setup parameters and/or the measurement of the resonance frequency is executed immediately before or immediately after the data exchange.

In one embodiment, the data exchange and/or the measurement of the setup parameters is/are carried out in time ranges in which the network voltage has a zero crossing.

In one embodiment, the measurement of the resonance frequency is carried out in time ranges which end 0.5 ms to 2 ms before a zero crossing of the network voltage or is carried out in time ranges which begin 0.5 ms to 2 ms after a zero crossing of the network voltage.

In one embodiment, during the measurement of the resonance frequency, the inverter is actuated in such a way that the actuation voltage switches over with a detection of a zero crossing or a sign change of a current in the power coil, in particular to effectuate an undamped oscillation. It is apparent that the detection of the zero crossing can also be carried out based on an amperage just before the zero crossing, so that a delay of the actuation of the inverter can be compensated for. The amperage used to detect the zero crossing can be dynamically tracked in such a way that the real switching process of the inverter coincides with the real current zero crossing. The amperage used to detect the zero crossing can be converted, for example, into a corresponding voltage value which is supplied to a comparator as a comparator threshold.

In one embodiment, if a predetermined peak amperage of the current flowing in the power coil is exceeded, the measurement of the resonance frequency is ended.

In one embodiment, an operating frequency, at which the power coil is subsequently actuated during the power transfer, is ascertained based on the ascertained resonance frequency by means of the device.

In one embodiment, the operating frequency is set between 0.5 kHz and 3 kHz greater than the resonance frequency.

In one embodiment, the electrical consumer transfers operating frequency-relevant items of information to the device, for example relating to its effective electrical load impedance. The device sets the operating frequency as a function of the resonance frequency and the operating frequency-relevant items of information. For example, the difference between resonance frequency and operating frequency can be set smaller with increasing effective electrical load impedance.

The device according to the invention for wireless transfer of energy in the direction of an electrical consumer by means of inductive coupling is designed to carry out an above-described method.

In the following explanations, the device for wireless transfer of energy in the direction of the electrical consumer by means of inductive coupling is referred to as a transmitter and the electrical consumer is referred to as a receiver.

The invention provides a method for determining special characteristic operating points of the transfer function by the transmitter, wherein the transfer function describes the transferable power over the frequency.

The measurement of the transfer function is not reasonably applicable in practice because of time-variant behaviour of the receiver. If one measures the transfer function by means of a frequency sweep, for example, a motor is then excited in dependence on the swept frequency spectrum and changes its property over the measurement duration and thus the transfer function can also change during the measurement.

The measurement of the transfer function has the advantage that the transmitter knows the maximum transferable power for the entire spectrum of operating frequencies. The determination according to the invention of the resonance frequency (frequencies) is more robust, however, and also permits the determination of suitable operating frequencies both for the start of the energy transfer and also during the operation after changing the transfer function, for example, due to a shift of the receiver, i.e., the change of the coupling, or due to a load change, i.e., a variable motor speed or a variable motor torque, switching load resistors in or out, etc.

By means of the method according to the invention, a suitable operating frequency can be determined which enables very fast regulation to the setpoint power. It is obvious that a second, higher-frequency resonance frequency can also be determined, which can be used as the basis for the determination of corresponding operating points having higher transfer efficiency.

According to the invention, the measurement of the resonance frequency is carried out essentially directly after a data transfer or a measurement of the setup parameters (Foreign Object Detection, FOD). The data transfer or the measurement of the setup parameters takes place in active operation every +/−1 ms around all grid zero crossings as long as the absolute value of the grid voltage is still relatively low and therefore in spite of resonance operation, the resulting current does not become excessively large. A measurement of the resonance frequency directly before the data transfer or directly before the measurement of the setup parameters is alternatively conceivable.

During the wireless power transfer, the impedance and resonance frequency vary significantly in dependence on the set-up receiver, double peaks can even occur in the transfer function. Nonetheless, fast regulation of the power is necessary, for example, to absorb a shift of the receiver or a load change and keep the receiver stable in its operating behaviour.

An electrical actual power emitted by the inverter can be regulated to a predeterminable electrical setpoint power, wherein a frequency and a duty cycle of the pulse-width-modulated actuation signal are used as manipulated variables of the regulation. For regulation to the setpoint power, the following steps are carried out: a) setting a starting frequency, b) setting a starting duty cycle in such a way that the setpoint power is not reached, c) measuring an electrical actual power emitted by the inverter at the set starting frequency and the set starting duty cycle, d) selecting a regulating setpoint power which is less than or equal to the setpoint power, e) calculating a duty cycle which corresponds in computation to the regulating setpoint power, f) setting the calculated duty cycle, g) measuring an electrical actual power emitted by the inverter at the set frequency and the set duty cycle, and h) repeating steps d) to g) with increasing regulating setpoint power until a deviation between the setpoint power and the actual power falls below a predetermined threshold.

The above-described starting frequency can be ascertained easily based on the measurement of the resonance frequency by means of the method according to the invention.

A higher-frequency resonance frequency can be determined, around which corresponding operating points having equal power level can lie, which can have a higher transfer efficiency. For this purpose, the measurement of the resonance frequency is started at a high frequency and the speed of change of the frequency regulation has to be limited, for example, to <2 kHz.

The method according to the invention is used for determining a resonance frequency for an inverter in half-bridge or full-bridge technology for energy transfer to a wireless consumer. During the ascertainment of the resonance frequency, the output voltage of the inverter and the current in the power coil or transmitter coil are approximately in phase at least at the end of a measurement (phase angle between voltage and current <+/−20°, preferably <+/−5), i.e., the switching of the switching means of the inverter takes place at the current zero crossing of the power coil current.

The power transfer from the transmitter to the receiver is periodically interrupted (Slotted Mode), wherein the interruptions preferably take place around a zero crossing of the network voltage. The interruptions (slots) can be used for communication between transmitter and receiver and/or for measurements, for example, the detection of impermissible foreign metal objects (Foreign Object Detection, FOD).

The measurement of the resonance frequency preferably takes place directly before or directly after the end of the data transfer or the communication slot (in Ki WPT typically 1 ms after zero crossing, can deviate therefrom depending on operating mode).

The measurement of the resonance frequency typically does not last longer than 0.5 ms, preferably not longer than 0.2 ms.

The data transfer or the communication slots takes/take place around the zero crossing of the network voltage.

The measurement of the resonance frequency is preferably terminated if a maximum current is exceeded.

The measurement of the resonance frequency is preferably ended when the measured frequency no longer significantly changes, i.e., for example, the frequency change between two periods is <1 kHz, preferably <0.5 kHz.

A current level at resonance and the associated voltage can be determined and the possible transferable power in resonance operation can be estimated based thereon.

An operating frequency for the power transfer can be calculated in that a Delta-f is added to the measured resonance frequency, wherein Delta-f is at most 5 kHz, preferably at most 2 kHz. Delta f can be varied in dependence on the estimated power in resonance operation and/or a communicated parameter of the receiver.

The inverter is preferably operated using the new operating frequency immediately after the measurement of the resonance frequency, at least still in the grid half-wave of the grid voltage directly following the communication slot, preferably at least 1.5 ms before reaching the grid voltage maximum of the grid voltage.

The inverter is preferably advantageously actuated using the operating frequency in the first half-wave of the grid voltage using a duty cycle <30% for the power transfer.

Preferably, upon the start of the power transfer with the switching over from the data transfer to the power transfer, the measurement of the resonance frequency is carried out and a first resonance frequency is determined. A new measurement of the resonance frequency is preferably carried out when the measured actual power of a grid half-wave of the grid voltage is at least 20%, in particular at least 10%, less than the setpoint power for the next grid half-wave and the duty cycle is already greater than 40%. A trigger for a redetermination of an operating frequency is preferably a relevant inadequate power, which can be triggered both by sinking of the actual power due to change of the transfer function and also by a setpoint power jump. Positive deviations can be corrected immediately by means of duty cycle, small negative deviations can be compensated for by a reduction of the working frequency by a few hundred hertz.

The measurement of the resonance frequency can be started using a controlled on-period of one or both switching means of a half-bridge of the inverter. A first on-period can correspond to a half periodic duration of a lowermost operating frequency.

The measurement of the resonance frequency can be started at a predetermined, high actuation frequency of the inverter, wherein the change of the actuation frequency is limited to less than +/−5 kHz, preferably +/−2 kHz, so that a local maximum can be found at higher frequencies.

A deviation of the actual power can be detected by the integration of a measurement of the resonance frequency during a power transfer to the consumer and compensated for promptly in the next or the next but one grid half-wave of the grid voltage, so that the mean power of the receiver remains constant.

The measurement of the resonance frequency can, according to the invention, be carried out completely in the transmitter independently of the receiver. Parameters communicated optionally from the receiver can be used solely for the determination of a suitable Delta f.

The transfer function is dependent on the coupling between receiver and transmitter and the load in the receiver. The transferred power at a specific operating point can therefore change if the receiver switches over the load, for example, from a motor to a heater, if the receiver is shifted and the coupling changes, or due to a load change, for example, the addition of foods to a mixer, which causes a torque change on the motor. A change of the transfer function can in principle be defined by a changed power at otherwise uniform operating point (frequency and duty cycle). If a change of the transfer function occurs, the required setpoint power thus has to be set as quickly as possible.

A power reduction can take place immediately via the duty cycle. An increase of the emitted power is possible at uniform operating frequency only, and only to a minor extent, when the duty cycle is still <50%. Otherwise, the operating frequency has to be changed. Depending on the coupling and load, the power difference upon changed frequency dP/df can be very large, this is then referred to as a steep transfer function. In addition, possible previously stored operating points are no longer valid, since the transfer function has strongly changed. In the extreme case, dP/df can even change the sign, i.e., a frequency change which would have reduced the power difference with the prior transfer function could result in a greater power deviation.

Instead of slowly feeling toward a suitable frequency, a starting frequency is immediately predetermined according to the invention, at which any required power at least up to the nominal power is possible. The same principle is used for finding the starting operating point for the first time.

According to the invention, the measurement of the resonance frequency is carried out for this purpose. The resonance frequency is in this case not necessarily the frequency at which the maximum power can be transferred, but rather the frequency at which the phase angle between current and voltage is 0°. Current-free switching of the IGBTs thus results, which is advantageous. The frequency at which the maximum power would be transferred is usually in the capacitive frequency range, which is disadvantageous for the operation of the induction. The achievable power in the power maximum is furthermore significantly too high, i.e., the demands on the resolution in the duty cycle increase. At the resonance frequency, the achievable power is still greater than the nominal power, so that this operating point is preferred.

The generation of the actuation signal of the inverter for the measurement can be implemented in hardware and/or in software. A comparator can, for example, generate the actuation signal for the drivers of the IGBTs of the inverter. Depending on whether the current through the power coil is positive or negative, a high level or low level is output. Switching is thus always carried out in the current zero crossing and a phase angle of close to 0° is achieved. If a phase angle of exactly 0° is to be achieved, switching thus has to be carried out at an amperage somewhat before the zero crossing, wherein the period until the zero crossing then corresponds to the actuation delay by comparator, drivers, and IGBT. The actual frequency can then be measured, for example, by measuring the period duration.

Generating the signal in software has the advantage that the frequency is immediately known. In addition, dead times for the IGBTs and dead times of the driver may be compensated for in software, so that the resonance can be more on target and the frequency can be determined more accurately.

Depending on the residual charge of the resonant circuit capacitors and the intermediate circuit capacitor, it can be that a current through the power coil does not occur of its own accord and therefore the measurement does not start. To prevent this behaviour, before switching over to the comparator-based actuation of the inverter, an actuation can take place for a few, preferably one or even only one-half PWM period, which is sufficient to switch the comparator for the first time and initiate the resonant oscillation.

Due to the high maximum power (50% duty cycle) at the resonance frequency, a highly dynamic regulation of the power is possible here. The required duty cycle can simply be calculated for a predetermined setpoint power and the operating point can be set within a few regulating steps. If the setpoint power is reached, the operating frequency can then slowly be optimized, for example, in such a way that the efficiency increases, a frequency synchronization is enabled between cooking and Ki points, or the EMC is improved.

The maximum power at the measured resonance frequency is higher than the nominal power, typically also higher than the required power to compensate for the losses due to coupling, etc. To be able to more finely regulate the power, it is advantageous to operate slightly above this resonance frequency.

For this purpose, an offset is added to the measured resonance frequency. This offset is dependent on the slope dP/df at the resonance frequency and can be estimated via the factor QPRx or a combination of receiver inductance and load resistance. If the factor is not transferred from the receiver, a fixed value can be added as the offset, for example, 2 kHz. Alternatively, it is also possible to operate directly using the resonance frequency, thus at an offset of 0 Hz.

The transferred power during the measurement is dependent on the receiver and the existing charge in the intermediate circuit and the resonant circuit capacitors. A short measuring period of 0.2 ms to 0.5 ms reduces the transferred power. For a possible compensation, it is advantageous to also record the power during the measurement of the resonance frequency. In spite of the short period, a not insignificant power can be transferred, since operation takes place at the resonance frequency.

In principle, the measurement of the resonance frequency is safe, although measurement is carried out in resonance, because, on the one hand, the period of the measurement is kept short and the presence of a receiver, and thus a load, was already confirmed by the data transfer in the form of the NFC communication.

However, the receivers contain a switching means for interrupting the receiver circuit in case of fault and as a protection mechanism. If this switch is not closed, the transmitter thus does not see a load and the operation or the measurement at the resonance frequency would be unfavourable. In contrast, rapid switching off in the event of overcurrent is used. In the best case, the current limit is monitored using a comparator and if a maximum current is exceeded, the measurement is immediately terminated. Alternatively, termination can also take place at a specific power.

The measurement can be ended early as soon as the resonance frequency has been recognized.

The overall measurement period of the measurement of the resonance frequency is to be short so that a measurement can take place in running operation without significant increase (at low setpoint power) or reduction (at high setpoint power) of the transferred power. In practical terms, the power is always greater at the resonance frequency than any setpoint power, i.e., only an increase has to be avoided.

The measurement at the beginning of the grid half-wave of the grid voltage takes place in a time period in which the transferred power is only a fraction of the power of the overall grid half-wave. Due to P~U$^2$, the majority of the power is transferred in the grid voltage maximum, so that the influence of the measurement remains small at the beginning of the grid half-wave.

A deviation from the setpoint power can be corrected accordingly in the next or next but one AC half-wave, so that the mean power of the receiver remains constant.

A measurement has to be carried out before the start of the regulation of the transferred power but can also be repeated in operation to establish changes of the transfer function due to shifting of the receiver or a load change.

Before the measurement of the resonance frequency can take place, the system has to be sufficiently stabilized, i.e., the measurement of the following period at equal frequency should only deviate in an acceptable range. The stabilization has to be observed both at the start of the measurement before starting the power transfer and also when switching over the operating frequency from the operation of the power transfer to the measurement operation.

When switching over from oscillation excitation to measurement operation and from measurement operation to normal operation, it is to be ensured that the frequencies merge harmonically, i.e., the switching over is synchronized with the present switching points in time to substantially avoid additional delays for the stabilization and noise generation due to harmonics.

In the transmitter, only a relatively small energy storage device is provided in the intermediate circuit for reasons of cost. If a large amount of power is transferred during the preceding grid half-wave, the voltage for the next starting frequency measurement is thus low.

Nonlinearities via the deflection, thus current, do not play a role for the measurement since they have a strong effect on the transferred power, but only affect the frequency very little or not at all. Possible errors are noncritical since a power greater than the nominal power can be achieved at the operating point in any case, i.e., there is a type of tolerance band in which possible starting frequencies for the search for the actual operating frequency lie.

The measurement of the resonance frequency is not carried out in each grid half-wave. In principle, it is always required only when the transfer function is unknown. This is the case, for example, if at the very beginning the load impedance and the setup position, thus the coupling, are unknown, the setup position of the receiver, thus the coupling, has changed, and the load in the receiver has changed, whether due to planned switching over from different loads by the receiver controller or unplanned, for example, due to a changing load at the motor as in a mixer, or if a significantly higher setpoint power is requested at uniform load impedance, so that a frequency change is necessary over multiples of 5 kHz.

The invention is described in detail hereinafter with reference to the drawings. In the figures:

FIG. 1 shows a block diagram of a device 100 for wireless transfer of energy in the direction of an electrical consumer 200 by means of inductive coupling.

Figure 1:
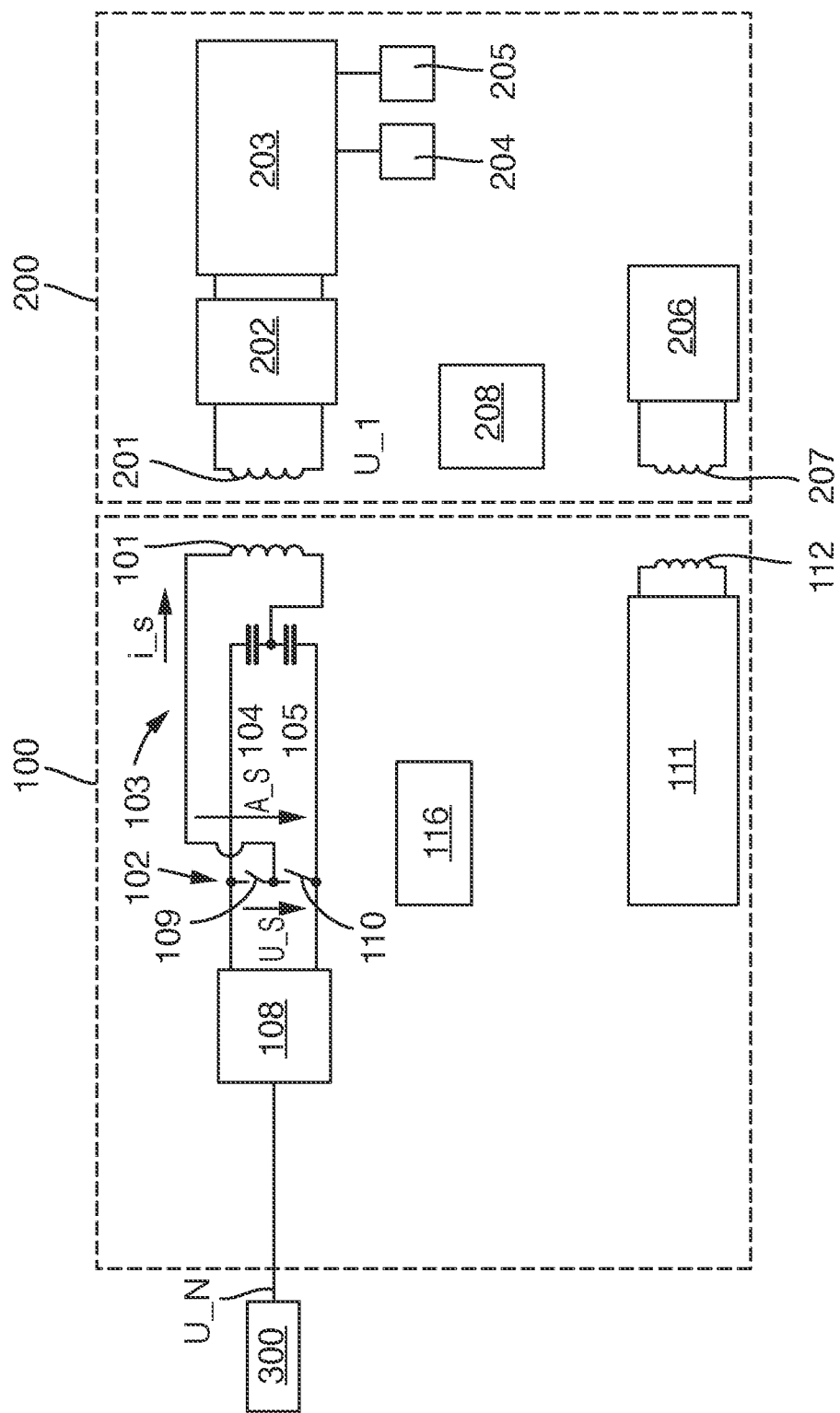
FIG. 1 shows a block diagram of a device for wireless transfer of energy and an associated electrical consumer.

The device 100 has a rectifier 108 for generating a DC voltage U_S from a conventional single-phase grid voltage U_N of an AC voltage grid 300.

The device 100 furthermore has an inverter 102 fed from the DC voltage U_S having switching means 109 and 110, which is designed to generate a pulse-width-modulated actuation signal A_S.

The device 100 furthermore has capacitors 104, 105, which are connected in series between output terminals of the rectifier 108 or the feed voltage U_S, respectively.

The device 100 furthermore has a power coil 101 actuated by means of the pulsewidth-modulated actuation signal A_S, wherein the capacitors 104, 105 and the power coil 101 are interconnected in such a way that they form a resonant circuit 103. For this purpose, one terminal of the power coil 101 is electrically connected to a connecting node of semiconductor switching means 109, 110 of the inverter 102 and another terminal of the power coil 101 is connected to a connecting node of the capacitors 104, 105.

It is apparent that the illustrated inverter and resonant circuit topology is solely exemplary. For example, an inverter having a full bridge can be used in the scope of the present invention, differently interconnected series or parallel resonant circuits can be used, etc.

A magnetic alternating field for transferring the energy is generated by means of the power coil 101.

The device 100 furthermore has a communication unit 111, which is coupled to a communication coil 112. The communication unit 111 in conjunction with the communication coil 112 is used for bidirectional data exchange with the electrical consumer 200.

The device 100 furthermore has a regulator 116, which is designed to regulate a power emitted by the inverter 102 to a predeterminable setpoint value, wherein a frequency and/or a duty cycle of the actuation signal A_S is/are used as manipulated variable.

The electrical consumer 200 has a power coil 201 and a passive LC resonant circuit 202 connected downstream.

The electrical consumer 200 furthermore has a switching unit 203 for changing a load impedance of the electrical consumer 200. The elements 204 and 205 are shown by way of example as loads which can be switched in and out.

The electrical consumer 200 furthermore has a communication unit 206, which is coupled to a communication coil 207. The communication unit 206 in conjunction with the communication coil 207 is used for bidirectional data exchange with the device 100.

The electrical consumer 200 furthermore has a control unit 208, which controls the operation of the electrical consumer 200. The control unit 208 has a data connection to the switching unit 203 and the communication unit 206. The control unit 208 controls, inter alia, the synchronized changing of the load impedance by suitable actuation of the switching unit 203 and communication with the device 100.

Figure 2:
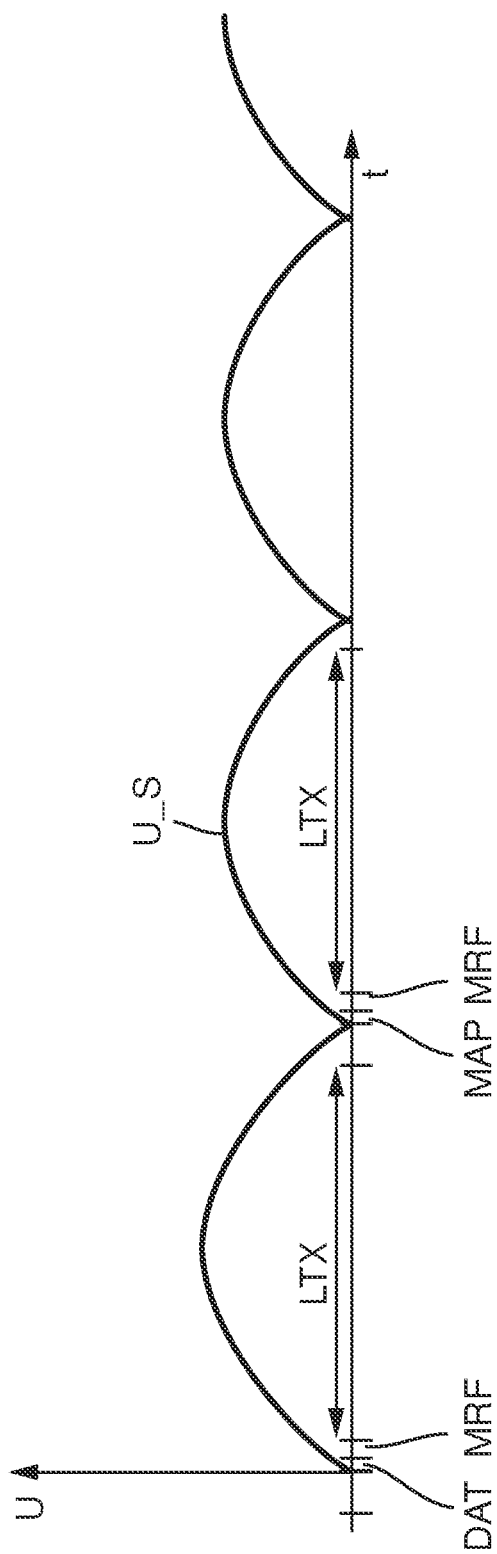
FIG. 2 shows a schematic time sequence of the method according to the invention.

FIG. 2 shows a schematic sequence of the method according to the invention over time.

As shown in FIG. 2, the DC voltage U_S has a half-wave-shaped profile, which corresponds to essentially rectified grid half-waves of the grid voltage U_N.

In time ranges or slots in which the grid voltage U_N has a zero crossing, either a data exchange DAT between device 100 and consumer 200 or a measurement of setup parameters MAP, also referred to as foreign object detection, FOD, takes place. A power transfer LTX conventionally takes place in between in associated time ranges or slots.

A measurement of the resonance frequency MRF of the resonant circuit 103 having the power coil 101 takes place immediately before or immediately after the measurement of the setup parameters MAP or immediately before or immediately after the data exchange DAT. In contrast to what is shown in FIG. 2 for illustration purposes, the measurement of the resonance frequency MRF generally does not take place in practice after the data transfer DAT or the measurement of the setup parameters MAP. Instead, the measurement of the resonance frequency MRF takes place at the beginning of the wireless transfer of energy in the direction of the electrical consumer 200 and subsequently upon relevant changes of the power transfer. Relevant changes can represent larger setpoint power jumps, shifting of the consumer 200 with a coupling change, and announced load jumps of the receiver 200, which require a redetermination of the operating frequency.

The measurement of the resonance frequency MRF takes place in time ranges which end 0.5 ms to 2 ms before a zero crossing of the grid voltage U_N or in time ranges which begin 0.5 ms to 2 ms after a zero crossing of the grid voltage U_N, as shown in FIG. 2.

During the measurement of the resonance frequency MFR, the inverter 102 is actuated in such a way that the actuation voltage A_S is switched over with a detection of a zero crossing of a current i_s in the power coil 101.

Based on the ascertained resonance frequency, an operating frequency is set immediately thereafter, using which the power coil 101 is actuated immediately thereafter during the power transfer LTX. The operating frequency is set, for example, between 0.5 kHz and 3 kHz less than the resonance frequency. Furthermore, the electrical consumer 200 can transfer operating frequency-relevant items of information to the device 100, wherein the operating frequency is set as a function of the resonance frequency and the operating frequency-relevant items of information.

Figure 3:
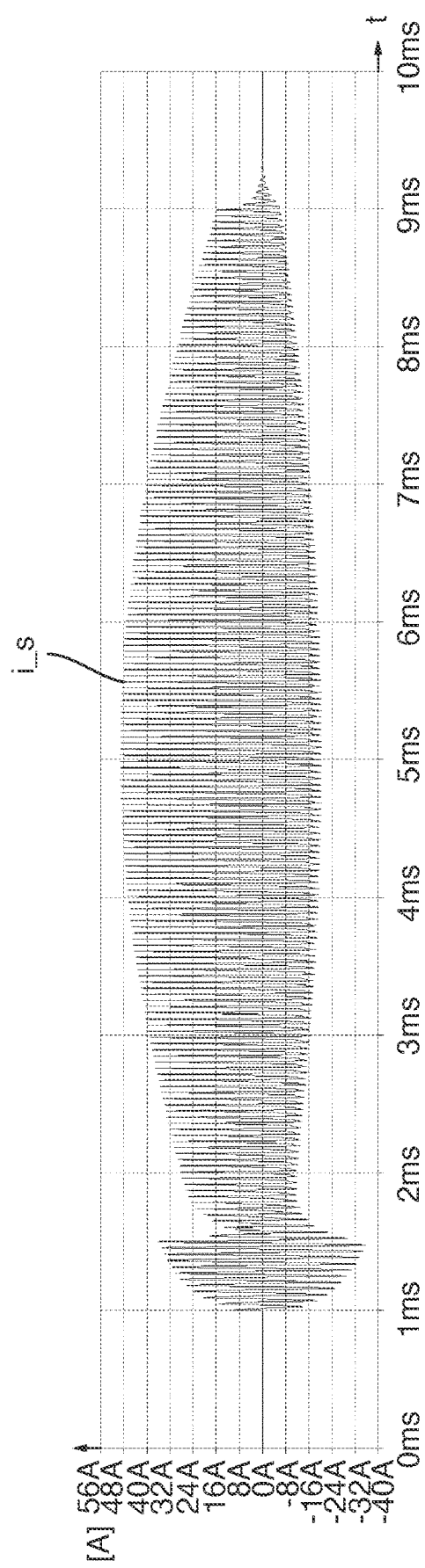
FIG. 3 shows a time curve of a current in a power coil during a half-wave of a grid voltage.

FIG. 3 shows a time curve of the current i_s in the power coil 101 during a half-wave of the grid voltage UN at 50 Hz.

In a slot between 0 ms and 1 ms, a data exchange DAT takes place between the device 100 and the consumer 200 via their communication coils 112 and 207, respectively.

In a slot between 1 ms and 1.5 ms, the measurement of the resonance frequency MRF takes place.

In a slot between 1.5 ms and 9 ms shortly before the end of the grid half-wave, the power transfer LTX takes place at an operating frequency which is set as a function of the measured resonance frequency.

At 9 ms, the power transfer is interrupted and the next slot is started for a next data transfer or for measuring setup parameters.

The invention claimed is:

1. A method for operating a device (100) for wireless transfer of energy in the direction of an electrical consumer (200) by means of inductive coupling, the method comprising:
   providing the device (100) comprising:
      a rectifier (108) for generating a DC voltage (U_S) from a grid voltage (U_N),
      an inverter (102) fed from the DC voltage (U_S), which is designed to generate a pulse-width-modulated actuation signal (A_S),
      a power coil (101) actuated by means of the pulse-width-modulated actuation signal (A_S), by means of which a magnetic alternating field can be generated to transfer the energy, and
      a communication unit (111), which is designed to exchange data bidirectionally with the electrical consumer (200), and
   sequentially carrying out a power transfer (LTX), a data exchange (DAT), a measurement of setup parameters (MAP), and a measurement of a resonance frequency (MRF), wherein:
      during the power transfer (LTX), an electrical actual power emitted by the inverter (102) is regulated to a predetermined electrical setpoint value,
      during the data exchange (DAT), data are exchanged between the device (100) and the electrical consumer (200) by means of the communication unit (111),
      during the measurement of the setup parameters (MAP), objects possibly arranged over the power coil (101), in particular foreign objects, are detected,
      during the measurement of the resonance frequency (MRF), a resonance frequency of a resonant circuit (103) having the power coil (101) is ascertained,
      the measurement of the resonance frequency (MRF) is executed immediately before or immediately after the measurement of the setup parameters (MAP) or is executed immediately before or immediately after the data exchange (DAT), and
      based on the ascertained resonance frequency, an operating frequency is ascertained using which the power coil (101) is subsequently actuated during the power transfer (LTX).

2. The method according to claim 1, wherein at least one of the data exchange (DAT) or the measurement of the setup parameters (MAP) is/are carried out in time ranges in which the grid voltage (U_N) has a zero crossing.

3. The method according to claim 1, wherein the measurement of the resonance frequency (MRF) is carried out in time ranges which end 0.5 ms to 2 ms before zero crossing of the grid voltage (U_N) or is carried out in time ranges which begin 0.5 ms to 2 ms after zero crossing of the grid voltage (U_N).

4. The method according to claim 1, wherein during the measurement of the resonance frequency (MFR), the inverter (102) is actuated in a pulse-width-modulated way to switch over an actuation voltage upon a detection of a zero crossing of a current (i_s) in the power coil (101).

5. The method according to claim 4, wherein if a predetermined peak amperage of the current (i_s) flowing in the power coil (101) is exceeded, the measurement of the resonance frequency (MRF) is ended.

6. The method according to claim 1, wherein the operating frequency is set between 0.5 kHz and 3 kHz greater than the resonance frequency.

7. The method according to claim 1, wherein the electrical consumer (200) transfers operating frequency-relevant items of information to the device (100), wherein the operating frequency is set as a function of the resonance frequency and the operating frequency-relevant items of information.

8. A device (100) for wireless transfer of energy in the direction of an electrical consumer (200) by means of inductive coupling, the device (100) comprising:
- a rectifier (108) for generating a DC voltage (U_S) from a grid voltage (U_N),
- an inverter (102) fed from the DC voltage (U_S), which is designed to generate a pulse-width-modulated actuation signal (A_S),
- a power coil (101) actuated by means of the pulse-width-modulated actuation signal (A_S), by means of which a magnetic alternating field can be generated to transfer the energy, and
- a communication unit (111), which is designed to exchange data bidirectionally with the electrical consumer (200),
wherein the device (100) is configured to carry out the method of claim 1.

* * * * *